(12) United States Patent
Gerlach et al.

(10) Patent No.: US 7,190,783 B2
(45) Date of Patent: Mar. 13, 2007

(54) INTEGRATED DIGITAL SUBSCRIBER LINE TRANSCEIVER

(75) Inventors: Ronald R. Gerlach, Orange, CA (US); Mo-Ching Justine Lau, Orange, CA (US); Ramya Niroshana Dissanayake, Tustin, CA (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 739 days.

(21) Appl. No.: 10/641,702

(22) Filed: Aug. 15, 2003

(65) Prior Publication Data
US 2005/0047432 A1   Mar. 3, 2005

(51) Int. Cl.
*H04M 9/00* (2006.01)
*H04M 1/00* (2006.01)
*G06F 15/00* (2006.01)

(52) U.S. Cl. .................................. 379/399.01; 712/35

(58) Field of Classification Search ........... 379/399.01, 379/413.02, 413.04, 219, 220.01, 93.01, 379/93.08; 712/32–35; 375/219; 370/463, 370/532, 535
See application file for complete search history.

(56) References Cited

U.S. PATENT DOCUMENTS

| | | | |
|---|---|---|---|
| 6,775,305 B1 * | 8/2004 | Delvaux | 370/535 |
| 6,959,376 B1 * | 10/2005 | Boike et al. | 712/35 |
| 7,023,877 B1 * | 4/2006 | Blackburn et al. | 370/465 |
| 2005/0036562 A1 * | 2/2005 | Ranganathan et al. | 375/257 |

* cited by examiner

*Primary Examiner*—Benny Quoc Tieu
(74) *Attorney, Agent, or Firm*—Fogg & Powers LLC; Jon M. Powers

(57) ABSTRACT

An integrated digital subscriber line transceiver includes a single integrated circuit that has a digital signal processing engine, a time division multiplexing framer (for example, a T1/E1 framer), and a static random access memory. The integrated circuit also includes a microprocessor coupled to the digital signal processing engine, the time division multiplexing framer, and the static random access memory. The digital signal processing engine, in one embodiment, includes an HDSL2/G.SHDSL data pump and an HDSL2/G.SHDSL framer.

34 Claims, 2 Drawing Sheets

INTEGRATED DIGITAL SUBSCRIBER LINE TRANSCEIVER

TECHNICAL FIELD

The following description relates to telecommunications in general and to digital subscriber line (DSL) devices in particular.

BACKGROUND

One way in which telecommunication service providers provide high-speed digital communication services is by using digital subscriber line (DSL) technology. In one typical configuration, a line unit located in a central office of a service provider communicates with a remote unit located at a remote site. The central office line unit communicates with the remote unit over a high bit-rate digital subscriber line 2 (HDSL2) communication link or a symmetric digital subscriber line communication link supporting the ITU G.991.2 standard (referred to here as "G.SHDSL"). Such a HDSL2 or G.SHDSL link uses one twisted-pair telephone line. In other configurations, the central office line unit communicates with the remote unit over a high bit-rate DSL (HDSL or HDSL1) or a high bit-rate DSL 4 (HDSL4) communication link using two twisted-pair telephone lines.

The line unit and the remote unit typically include various components such as a hybrid circuit, a line driver, an analog front end, a digital signal processing (DSP) engine, a T1/E1 framer, and a T1/E1 line interface unit along with a microprocessor and different types of memory. Typically the T1/E1 framer, DSP engine, and microprocessor are physically embodied in separate components. This can lead to increased costs in constructing a line unit or remote unit from these components due to, for example, increased costs associated with procuring, integrating, and testing the different components.

SUMMARY

In one embodiment, an integrated digital subscriber line transceiver includes a single integrated circuit having a digital signal processing engine adapted to couple the transceiver to at least one digital subscriber line communication link. The single integrated circuit also includes a time division multiplexing framer adapted to couple the transceiver to at least one time division multiplexing communication link. The single integrated circuit further includes a static random access memory and a microprocessor. The microprocessor is coupled to the digital signal processing engine, the time division multiplexing framer, and the static random access memory.

In another embodiment, a digital subscriber line unit includes an analog interface adapted to couple the digital subscriber line unit to at least one digital subscriber line communication link. The digital subscriber line unit further includes a time division multiplexing line interface unit adapted to couple the digital subscriber line unit to at least one time division multiplexing communication link. The digital subscriber line unit further includes an integrated digital subscriber line transceiver. The integrated digital subscriber line transceiver includes a single integrated circuit having a digital signal processing engine coupled to the analog interface. The single integrated circuit further includes a time division multiplexing framer coupled to the time division multiplexing line interface unit. The single integrated circuit further includes a static random access memory and a microprocessor. The microprocessor is coupled to the digital signal processing engine, the time division multiplexing framer, and the static random access memory.

In another embodiment, an integrated digital subscriber line transceiver includes a single integrated circuit having a digital signal processing engine adapted to couple the transceiver to at least one digital subscriber line communication link and to at least one time division multiplexing communication link. The single integrated circuit further includes a static random access memory and a microprocessor. The microprocessor is coupled to the digital signal processing engine and the static random access memory.

In another embodiment, a digital subscriber line unit includes an analog interface adapted to couple the digital subscriber line unit to at least one digital subscriber line communication link. The digital subscriber line unit further includes a time division multiplexing line interface unit adapted to couple the digital subscriber line unit to at least one time division multiplexing communication link. The digital subscriber line unit further includes a time division multiplexing framer coupled to the time division multiplexing line interface unit and an integrated digital subscriber line transceiver. The integrated digital subscriber line transceiver includes a single integrated circuit having a digital signal processing engine coupled to the analog interface and the time division multiplexing framer. The single integrated circuit further includes a static random access memory and a microprocessor. The microprocessor is coupled to the digital signal processing engine, the time division multiplexing framer, and the static random access memory.

The details of one or more embodiments of the claimed invention are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 1:
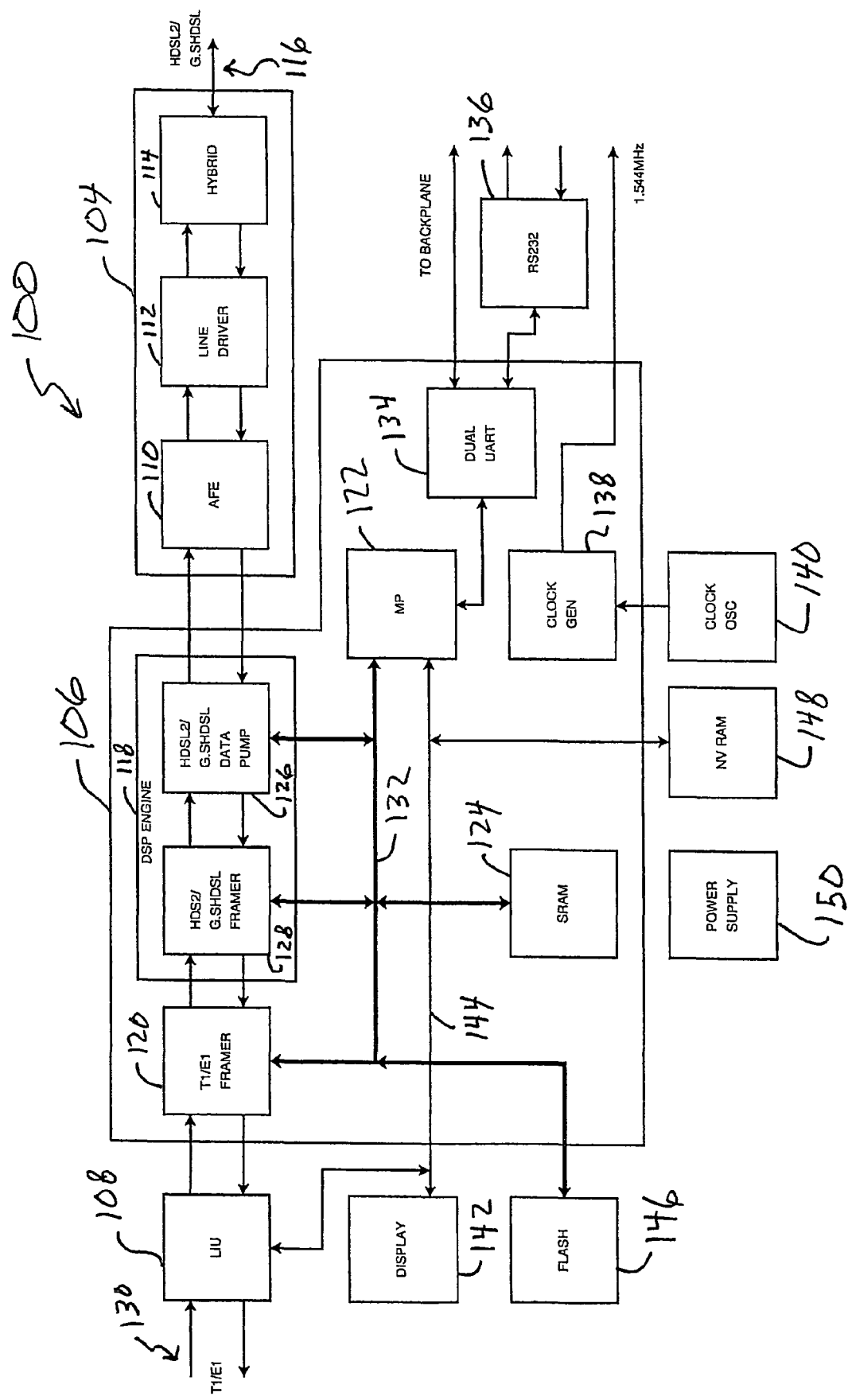
FIG. 1 is a block diagram of one embodiment of a line unit having an integrated transceiver.

FIG. 1 is a block diagram of one embodiment of a digital subscriber line (DSL) unit 100. Embodiments of DSL unit 100 are suitable for use in, for example, a line unit housed within a central office of a service provider and/or a remote unit located at a remote site (for example, a remote unit housed within a remote terminal). The embodiment of the DSL unit 100 shown in FIG. 1 supports communicating over an HDSL2 or G.SHDSL communication link. In other embodiments, other DSL communication links (for example, HDSL and/or HDSL4 communication links) are supported in addition to, or instead of, HDSL2 and/or G.SHDSL communication links. DSL unit 100 is used to send and receive DS1 traffic over an HDSL2 or G.SHDSL communication link using one twisted-pair telephone line (also referred to here as a "local loop" or "loop"). Data received from the HDSL2 or G.SHDSL link is coupled to a time division multiplexing (TDM) link that is cross-connected to a TDM network. In the embodiment shown in FIG. 1, the TDM link is a T1 or E1 communication link.

Digital subscriber line unit 100 includes an analog interface 104, an integrated transceiver 106, and a TDM line interface unit 108. The analog interface 104 includes an analog front end (AFE) 110. The analog front end 110 includes a transmit channel and a receive channel (not shown in FIG. 1). In the transmit channel, the AFE 110 receives a digital pulse amplitude modulated (PAM) data stream from the integrated transceiver 106, converts the digital stream to an analog signal, and filters the analog signal to suppress out-of-band noise. The analog signal is output to a line driver 112 for amplification. In the receive channel, the AFE 110 receives an analog signal from a hybrid circuit 114, amplifies the received analog signal, and converts the amplified analog signal to a digital signal. The digital signal is output to the integrated transceiver 106.

The hybrid circuit 114 couples the analog interface 104 to a twisted-pair telephone line 116. In embodiments of DSL unit 100 that support an HDSL2 single pair communication link, the hybrid circuit 114 couples one twisted-pair telephone line to the analog interface 104. In other embodiments, the hybrid circuit 114 couples the analog interface 104 to multiple twisted-pair telephone lines (for example, 2 telephone lines in the case of HDSL, HDSL4, or 2-pair G.SHDSL embodiments). A separate 2-line transmit path and a separate 2-line receive path for each twisted-pair telephone line is provided between the AFE 110 and the integrated transceiver 106. In one embodiment, the analog interface 104 is implemented as a single integrated circuit that includes the analog front end 110, the line driver 112, and the hybrid circuit 114.

The integrated transceiver 106 is a single integrated circuit that includes a digital signal processing (DSP) engine 118, a time division multiplexing (TDM) framer 120, a microprocessor 122 and a static random access memory 124. In the embodiment shown in FIG. 1, the DSP engine 118 supports G.SHDSL and HDSL2 communication links, in other embodiments other DSL communication links (such as HDSL or HDSL4 communication links) are supported in addition to, or instead of, HDSL2 and/or G.SHDSL communication links. The DSP engine 118 includes an HDSL2/G.SHDSL data pump 126 and an HDSL2/G.SHDSL framer 128. In the embodiment shown in FIG. 1, the TDM framer 120 is a framer that supports T1 and/or E1 communication links.

In the downstream, the TDM line interface unit 108 receives an analog DS1 signal from a TDM communication link 130 (such as a T1/E1 communication link) and converts the analog DS1 signal to a digital pulse code modulated (PCM) signal for the TDM framer 120. The TDM framer 120 outputs a serial digital DS1 data stream that is encapsulated into a stream of HDSL2 or G.SHDSL frames by the HDSL2/G.SHDSL framer 128. The output of the HDSL2/G.SHDSL framer 128 is encoded and bit-to-level mapped by the HDSL2/G.SHDSL data pump 126 and is output to the analog front end 110.

In the upstream, the HDSL2/G.SHDSL data pump 126 receives HDSL2 or G.SHDSL frames from the analog front end 110, which are decoded and level-to-bit mapped. The HDSL2/G.SHDSL framer 128 outputs DS1 data to the TDM framer 120, which encapsulates the DS1 data into appropriate TDM frames (for example, T1 or E1 frames) for transmission onto the TDM communication link 130 via the TDM line interface unit 108. In the embodiment shown in FIG. 1, the TDM line interface unit 108 is embodied as a physically separate device and supports T1 and/or E1 communication links.

The microprocessor 122 communicates with and controls the operation of the DSP engine 118 and the TDM framer 120. In the embodiment shown in FIG. 1, the microprocessor 122 communicates with the DSP engine 118 and the TDM framer 120 over a 16-bit bus 132. The microprocessor 122 is coupled to static random access memory (RAM) 124 over the 16-bit bus 132. Program instructions executed by the microprocessor 120 along with data used by the microprocessor 122 and other components of the transceiver 106 are stored in and retrieved from the static RAM 124. In one implementation, the static RAM 124 is a 128 kilobit by 8 bit static RAM.

The integrated transceiver 106 also includes a dual universal asynchronous receiver-transmitter (UART) 134. The dual UART 134 couples the microprocessor 122 to a RS-232 serial port 136. A data terminal (not shown) can be connected to the RS-232 serial port 136 in order to communicate with a control program executing on the microprocessor 122. In one embodiment, the control program is used to view and/or modify various configuration and status parameters of the DSL unit 100. The dual UART 134 also is used to couple the microprocessor 122 to a backplane (not shown) of a chassis in which the DSL unit 100 is housed. This allows a management program executing on a device external to the DSL unit 100 to communicate with the microprocessor 122 and the control program executing thereon over the backplane of the chassis.

The integrated transceiver 106 also includes a clock generator 138 that provides a clock signal to the components of the transceiver 106 and the DSL unit 100 based on a signal from a clock oscillator 140. In the embodiment shown in FIG. 1, the clock oscillator 140 is external to the transceiver 106. The microprocessor 122 also communicates with a display 142 over a serial bus 144. In the embodiment shown in FIG. 1, the TDM line interface unit 108 also communicates with the display 142. Display 142 is used to display, for example, information about the DSL unit 100 and/or the TDM communication link 130. In one embodiment, display 142 includes a 4-character LED display mounted on a front panel of the DSL unit 100.

The DSL unit 100 also includes a flash memory 146. The flash memory 146 is coupled to the microprocessor 122 via the 16-bit bus 132. The flash memory 144 stores programs instructions that are executed on the microprocessor 122 and other components of the integrated transceiver 106 (such as the DSP engine 118). For example, in one embodiment, when the DSL unit 100 is powered on, any program instructions stored in the flash memory 144 are downloaded from the flash memory 144 to the microprocessor 122 and the other components for execution thereon. In one implementation, the flash memory 144 is a 512 kilobit by 8 bit flash memory.

The DSL unit 100 also includes a non-volatile random access memory 148 that is coupled to the microprocessor 122. Line interface settings and PRM data are stored in and retrieved from the non-volatile RAM 148 by the microprocessor 122 over the serial bus 144. In one implementation, the non-volatile RAM 148 is a 16 kilobit by 8 bit non-volatile RAM. The DSL unit 100 also includes a power supply 150 that supplies power to the various components of the DSL unit 100.

In operation, the TDM line interface unit 108 receives a downstream analog DS1 signal from the TDM communication link 130 and converts the analog DS1 signal to a digital PCM signal for the TDM framer 120. The TDM framer 120 outputs a serial digital DS1 data stream that is encapsulated into a stream of HDSL2 or G.SHDSL frames by the HDSL2/

G.SHDSL framer 128. The output of the HDSL2/G.SHDSL framer 128 is encoded and bit-to-level mapped by the HDSL2/G.SHDSL data pump 126 and is output to the analog front end 110. The AFE 110 receives the digital PAM data stream from the integrated transceiver 106, converts the digital stream to an analog signal, and filters the analog signal to suppress out-of-band noise. The analog signal is output to a line driver 112 for amplification and application to the twisted-pair telephone line 116 by the hybrid circuit 114.

In the upstream direction, the AFE 110 receives an HDSL2/G.SHDSL2 analog signal from the hybrid circuit 114, amplifies the received analog signal, and converts the amplified analog signal to a digital signal. The digital signal is output to the HDSL2/G.SHDSL data pump 126, which decodes and level-to-bit maps the received digital signal. The HDSL2/G.SHDSL framer 128 outputs digital DS1 data to the TDM framer 120 which encapsulates the DS1 data into appropriate T1/E1 frames for transmission onto the TDM communication link 130 via the TDM line interface unit 108.

Embodiments of the integrated transceiver 106 have an improved speed of operation because the microprocessor 122 is able to communicate with the DSP engine 118, T1/E1 framer 120, and static RAM 124 at a high clock rate over the internal 16-bit bus 132. Also, the amount of power required for those components to communicate with one another is reduced by using embodiments of the integrated transceiver 106. Moreover, the amount of board space that is needed to accommodate a DSP engine, T1/E1 framer, microprocessor, and static RAM is reduced by using embodiments of the integrated transceiver 106. This allows greater flexibility in designing embodiments of the DSL unit 100. Furthermore, embodiments of the integrated transceiver 106 can reduce the amount of testing and integration that is required to incorporate a DSP engine, T1/E1 framer, microprocessor, and the static random access memory into a line unit. In addition, the integrated transceiver 106 can be implemented as an all digital device that contains only digital components.

Figure 2:
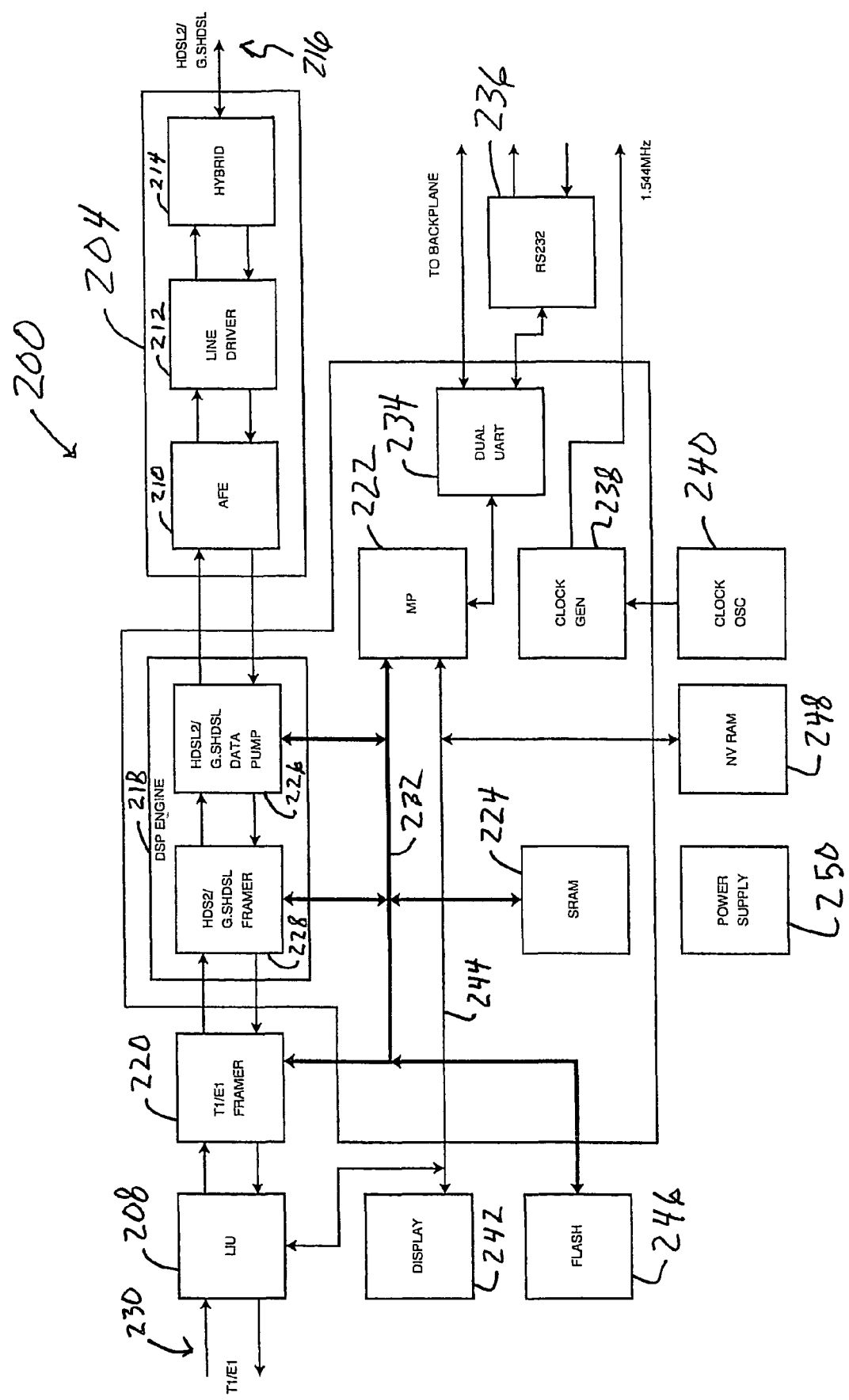
FIG. 2 is a block diagram of another embodiment of a line unit having an integrated transceiver.

FIG. 2 is a block diagram of an alternative embodiment of a digital subscriber line unit 200. Embodiments of DSL unit 200 are suitable for use in, for example, a line unit housed within a central office of a service provider and/or a remote unit located at a remote site (for example, a remote unit housed within a remote terminal). The embodiment of the DSL unit 200 shown in FIG. 2 supports communicating over an HDSL2 or G.SHDSL communication link. In other embodiments, other DSL communication links (for example, HDSL and/or HDSL4 communication links) are supported in addition to, or instead of, HDSL2 and/or G.SHDSL communication links. Digital subscriber line unit 200 is used to send and receive DS1 traffic over an HDSL2 or G.SHDSL communication link using one twisted-pair telephone line. Data received from the HDSL2 or G.SHDSL link is coupled to a TDM link that is cross-connected to a TDM network. In the embodiment shown in FIG. 2, the TDM link is a T1 or E1 communication link.

The embodiment of a DSL unit 200 shown in FIG. 2 is similar to the embodiment of the DSL unit 100 shown in FIG. 1 except that an integrated transceiver 206 of the DSL unit 200 does not include a TDM framer 220. Instead, the TDM framer 220 and a TDM line interface unit 208 are external to the integrated transceiver 206. For example, in one embodiment, the T1/E1 framer 220 and T1/E1 line interface unit 208 are physically embodied together in a single integrated circuit. Elements of the embodiment of DSL unit 200 shown in FIG. 2 corresponding to respective elements of the embodiment of the DSL unit 100 shown in FIG. 1 are numbered with like reference numbers that are incremented by 100.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. An integrated digital subscriber line transceiver, comprising:
    a single integrated circuit having:
        a digital signal processing engine adapted to couple the transceiver to at least one digital subscriber line communication link;
        a time division multiplexing framer adapted to couple the transceiver to at least one time division multiplexing communication link;
        a static random access memory; and
        a microprocessor coupled to the digital signal processing engine, the time division multiplexing framer, and the static random access memory.

2. The integrated transceiver of claim 1, wherein the digital signal processing engine is adapted to couple the transceiver to the digital subscriber line communication link using an analog front end.

3. The integrated transceiver of claim 1, wherein the time division multiplexing framer is adapted to couple the transceiver to one time division multiplexing communication link using a time division multiplexing line interface unit.

4. The integrated transceiver of claim 1, wherein the single integrated circuit further includes a bus coupled to the digital signal processing engine, the time division multiplexing framer, the microprocessor and the static random access memory.

5. The integrated transceiver of claim 1, wherein the digital signal processing engine includes a digital subscriber line data pump adapted to couple the digital signal processing engine to the at least one digital subscriber line communication link.

6. The integrated transceiver of claim 5, wherein the digital signal processing engine includes a digital subscriber line framer coupled to the digital subscriber line data pump and the time division multiplexing framer.

7. The integrated transceiver of claim 1, wherein the digital signal processing engine includes an HDSL2 digital signal processing engine.

8. The integrated transceiver of claim 1, wherein the digital signal processing engine includes a G.SHDSL digital signal processing engine.

9. The integrated transceiver of claim 1, wherein the time division multiplexing framer includes a T1/E1 framer.

10. A digital subscriber line unit, comprising:
an analog interface adapted to couple the digital subscriber line unit to at least one digital subscriber line communication link;
a time division multiplexing line interface unit adapted to couple the digital subscriber line unit to at least one time division multiplexing communication link; and
an integrated digital subscriber line transceiver, comprising:
a single integrated circuit having:
a digital signal processing engine coupled to the analog interface;
a time division multiplexing framer coupled to the time division multiplexing line interface unit;
a static random access memory; and
a microprocessor coupled to the digital signal processing engine, the time division multiplexing framer, and the static random access memory.

11. The digital subscriber line unit of claim 10, wherein the single integrated circuit further includes a bus coupled to the digital signal processing engine, the time division multiplexing framer, the microprocessor and the static random access memory.

12. The digital subscriber line unit of claim 10, wherein the digital signal processing engine includes a digital subscriber line data pump adapted to couple the digital signal processing engine to the analog front end.

13. The digital subscriber line unit of claim 12, wherein the digital signal processing engine includes a digital subscriber line framer coupled to the digital subscriber line data pump and the time division multiplexing framer.

14. The digital subscriber line unit of claim 10, wherein the digital signal processing engine includes an HDSL2 digital signal processing engine.

15. The digital subscriber line unit of claim 10, wherein the digital signal processing engine includes a G.SHDSL digital signal processing engine.

16. The digital subscriber line unit of claim 10, wherein the time division multiplexing framer includes a T1/E1 framer.

17. The digital subscriber line unit of claim 10, wherein the analog interface includes:
a hybrid circuit adapted to couple the analog interface to the at least one digital subscriber line communication link;
a line driver coupled to the hybrid circuit; and
an analog front end coupled to the line driver and the integrated transceiver.

18. The digital subscriber line unit of claim 10, wherein the time division multiplexing line interface unit includes a T1/E1 line interface unit.

19. An integrated digital subscriber line transceiver, comprising:
a single integrated circuit having:
a digital signal processing engine adapted to couple the transceiver to at least one digital subscriber line communication link and to at least one time division multiplexing communication link;
a static random access memory; and
a microprocessor coupled to the digital signal processing engine and the static random access memory.

20. The integrated transceiver of claim 19, wherein the digital signal processing engine is adapted to couple the transceiver to at least one digital subscriber line communication link using an analog front end and to at least one time division multiplexing communication link using a time division multiplexing line interface unit.

21. The integrated transceiver of claim 20, wherein the single integrated circuit further includes a bus coupled to the digital signal processing engine, the microprocessor and the static random access memory.

22. The integrated transceiver of claim 20, wherein the digital signal processing engine includes a digital subscriber line data pump adapted to couple the digital signal processing engine to the at least one digital subscribe line communication link.

23. The integrated transceiver of claim 22, wherein the digital signal processing engine includes a digital subscriber line framer coupled to the digital subscriber line data pump.

24. The integrated transceiver of claim 20, wherein the digital signal processing engine includes an HDSL2 digital signal processing engine.

25. The integrated transceiver of claim 20, wherein the digital signal processing engine includes a G.SHDSL digital signal processing engine.

26. A digital subscriber line unit, comprising:
an analog interface adapted to couple the digital subscriber line unit to at least one digital subscriber line communication link;
a time division multiplexing line interface unit adapted to couple the digital subscriber line unit to at least one time division multiplexing communication link; and
a time division multiplexing framer coupled to the time division multiplexing line interface unit;
an integrated digital subscriber line transceiver, comprising:
a single integrated circuit having:
a digital signal processing engine coupled to the analog interface and the time division multiplexing framer;
a static random access memory; and
a microprocessor coupled to the digital signal processing engine, the time division multiplexing framer, and the static random access memory.

27. The digital subscriber line unit of claim 26, wherein the digital signal processing engine includes a digital subscriber line data pump adapted to couple the digital signal processing engine to the at least one digital subscriber line communication link.

28. The digital subscriber line unit of claim 27, wherein the digital signal processing engine includes a digital subscriber line framer coupled to the digital subscriber line data pump and the time division multiplexing framer.

29. The digital subscriber line unit of claim 26, wherein the digital signal processing engine includes an HDSL2 digital signal processing engine.

30. The digital subscriber line unit of claim 26, wherein the digital signal processing engine includes a G.SHDSL digital signal processing engine.

31. The digital subscriber line unit of claim 26, wherein the time division multiplexing framer includes a T1/E1 framer.

32. The digital subscriber line unit of claim 26, wherein the analog interface includes:
   a hybrid circuit adapted to couple the analog interface to the at least one digital subscriber line communication link,
   a line driver coupled to the hybrid circuit; and
   an analog front end coupled to the line driver and the integrated transceiver.

33. The digital subscriber line unit of claim 26, wherein the time division multiplexing line interface unit includes a T1/E1 line interface unit.

34. The digital subscriber line unit of claim 26, wherein the time division multiplexing framer unit includes a T1/E1 framer.

* * * * *